(12) United States Patent
Sulzer et al.

(10) Patent No.: US 12,075,195 B2
(45) Date of Patent: *Aug. 27, 2024

(54) INTELLIGENT VIDEO SURVEILLANCE SYSTEM AND METHOD

(71) Applicant: ZeroEyes, Inc., Conshohocken, PA (US)

(72) Inventors: Timothy Sulzer, Jenkintown, PA (US); Michael Lahiff, Jenkintown, PA (US); Marcus Day, Jenkintown, PA (US)

(73) Assignee: ZeroEyes, Inc., Conshohocken, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/233,073

(22) Filed: Aug. 11, 2023

(65) Prior Publication Data
US 2023/0396737 A1 Dec. 7, 2023

Related U.S. Application Data

(63) Continuation of application No. 17/714,941, filed on Apr. 6, 2022, now Pat. No. 11,765,321, which is a
(Continued)

(51) Int. Cl.
*H04N 7/18* (2006.01)
*G06F 18/21* (2023.01)
(Continued)

(52) U.S. Cl.
CPC .......... *H04N 7/18* (2013.01); *G06F 18/2148* (2023.01); *G06F 18/217* (2023.01); *G06F 18/28* (2023.01);
(Continued)

(58) Field of Classification Search
CPC ............. G06K 9/00771; G06K 9/6255; G06K 9/3233; G06K 9/6262; G06K 9/6257;
(Continued)

(56) References Cited

U.S. PATENT DOCUMENTS

2016/0019427 A1 1/2016 Martin et al.
2016/0086050 A1 3/2016 Pikniewski et al.
(Continued)

OTHER PUBLICATIONS

Anderson et al., "Event Detection for Non Intrusive Load Monitoring", IEEE (Year: 2012).*
(Continued)

*Primary Examiner* — Qian Yang
(74) *Attorney, Agent, or Firm* — DLA Piper LLP (US)

(57) ABSTRACT

An intelligent video surveillance system is disclosed which performs real-time analytics on a live video stream. The system includes a training database populated with frames of actual video of objects of interest taken in a relevant environment. A subset of the frames include bounding boxes and/or bounding polygons which can be augmented. The training database also includes classification/annotation of data/labels relevant to the object of interest, a person carrying the object of interest, and/or the background or environment. The training database is searchable by the classification/annotation of data/labels.

34 Claims, 7 Drawing Sheets

Related U.S. Application Data continuation of application No. 16/876,535, filed on May 18, 2020, now Pat. No. 11,308,335.

(60) Provisional application No. 62/849,417, filed on May 17, 2019.

(51) Int. Cl.

| | |
|---|---|
| *G06F 18/214* | (2023.01) |
| *G06F 18/28* | (2023.01) |
| *G06V 10/25* | (2022.01) |
| *G06V 10/764* | (2022.01) |
| *G06V 10/82* | (2022.01) |
| *G06V 20/40* | (2022.01) |
| *G06V 20/52* | (2022.01) |

(52) U.S. Cl.
CPC ............ *G06V 10/25* (2022.01); *G06V 10/764* (2022.01); *G06V 10/82* (2022.01); *G06V 20/46* (2022.01); *G06V 20/52* (2022.01); *H04N 7/183* (2013.01)

(58) Field of Classification Search
CPC .... G06K 9/00744; G06K 9/627; H04N 7/183; H04N 7/18
See application file for complete search history.

(56) References Cited

U.S. PATENT DOCUMENTS

| | | | |
|---|---|---|---|
| 2018/0060653 A1* | 3/2018 | Zhang | .................... G06V 20/52 |
| 2019/0034734 A1* | 1/2019 | Yen | ...................... G06F 18/2413 |
| 2020/0082178 A1 | 3/2020 | Ahn et al. | |
| 2020/0101971 A1 | 4/2020 | Fan et al. | |
| 2020/0118647 A1 | 4/2020 | Zhang et al. | |
| 2020/0364466 A1 | 11/2020 | Latapie et al. | |

OTHER PUBLICATIONS

De Weerdt et al. "A Robust F-measure for Evaluating Discovered Process Models" 2011 IEEE Symposium on Computational Intelligence and Data Mining (CIDM) (Year: 2011).*

Xu et al., "An Efficient and Robust System for Multiperson Event Detection in Real-World Indoor Surveillance Scenes", IEEE Transactions on Circuits and Systems for Video Technology, vol. 25, No. 6, Jun. 2015 (Year: 2015).*

Ioannidis et al., "The False-positive to False-negative Ratio in Epidemiologic Studies", Epidemiology, vol. 22, No. 4, Jul. 2011 (Year:2011).

* cited by examiner

|   | A | B | C | D | E | F | G | H |
|---|---|---|---|---|---|---|---|---|
| 1 | Model | # Images | # Labels | Iteration | Momentum | Ratio | Learning Rate | Weight Decay |
| 2 | r10-55k | 4879 | 6476 | 55000 | 0.9 | 0.800 | 0.001 | 0.0005 |
| 3 | r10-65k | 4879 | 6476 | 65000 | 0.9 | 0.800 | 0.001 | 0.0005 |
| 4 | r10-70k | 4879 | 6476 | 70000 | 0.9 | 0.800 | 0.001 | 0.0005 |
| 5 | r10-75k | 4879 | 6476 | 75000 | 0.9 | 0.800 | 0.001 | 0.0005 |
| 6 | r10-60k | 4879 | 6476 | 60000 | 0.9 | 0.800 | 0.001 | 0.0005 |
| 7 | r10-60k2 | 4879 | 6476 | 65000 | 0.9 | 0.800 | 0.001 | 0.0005 |
| 8 | r10-62k | 4879 | 6476 | 62000 | 0.9 | 0.800 | 0.001 | 0.0005 |
| 9 | r10-68k | 4879 | 6476 | 68000 | 0.9 | 0.800 | 0.001 | 0.0005 |
| 10 | r10.1-60k | 4877 | 6464 | 60000 | 0.9 | 0.800 | 0.001 | 0.0005 |
| 11 | r10.1-62k | 4877 | 6464 | 62000 | 0.9 | 0.800 | 0.001 | 0.0005 |
| 12 | r10.1-65k | 4877 | 6464 | 62000 | 0.9 | 0.800 | 0.001 | 0.0005 |
| 13 | r10.1-67k | 4877 | 6464 | 67000 | 0.9 | 0.800 | 0.001 | 0.0005 |
| 14 | r10.1-70k | 4877 | 6464 | 70000 | 0.9 | 0.800 | 0.001 | 0.0005 |
| 15 | r10.1-80k | 4877 | 6464 | 80000 | 0.9 | 0.800 | 0.001 | 0.0005 |

FIG. 4A

| | A | I | J | K | L | M | N | O |
|---|---|---|---|---|---|---|---|---|
| 1 | Model | FP | Total FP | Total Hits | Hit/FP Ratio | FP/Hit Ratio | (FP/Hit)/(Hit/FP) Ratio | Status |
| 2 | r10-55k | 1 | 27 | 0 | 0.00 | N/A | N/A | Deleted |
| 3 | r10-65k | 1 | 4 | 52 | 13.00 | 7.7% | 0.59% | Keep |
| 4 | r10-70k | 1 | 5 | 0 | 0.00 | N/A | N/A | Deleted |
| 5 | r10-75k | 1 | 4 | 0 | 0.00 | N/A | N/A | Deleted |
| 6 | r10-60k | 1 | 5 | 47 | 9.40 | 10.6% | 1.13% | Deleted |
| 7 | r10-60k2 | 1 | 52 | 0 | 0.00 | N/A | N/A | Deleted |
| 8 | r10-62k | 1 | 92 | 0 | 0.00 | N/A | N/A | Deleted |
| 9 | r10-68k | 1 | 5 | 50 | 10.00 | 10.0% | 1.00% | Keep |
| 10 | r10.1-60k | 1 | 4 | 0 | 0.00 | N/A | N/A | Deleted |
| 11 | r10.1-62k | 1 | 3 | 47 | 15.67 | 6.4% | 0.41% | Keep |
| 12 | r10.1-65k | 1 | 4 | 47 | 11.75 | 8.5% | 0.72% | Keep |
| 13 | r10.1-67k | 1 | 6 | 0 | 0.00 | N/A | N/A | Deleted |
| 14 | r10.1-70k | 2 | 6 | 0 | 0.00 | N/A | N/A | Deleted |
| 15 | r10.1-80k | 1 | 16 | 0 | 0.00 | N/A | N/A | Deleted |

FIG. 4B

INTELLIGENT VIDEO SURVEILLANCE SYSTEM AND METHOD

CROSS-REFERENCE TO RELATED APPLICATIONS

This application is a continuation of U.S. patent application Ser. No. 17/714,941 filed on Apr. 6, 2022, which is a continuation of U.S. patent application Ser. No. 16/876,535 filed on May 18, 2020, now U.S. Pat. No. 11,308,335 issued Apr. 19, 2022, and claims benefit of U.S. Provisional Patent Appln. No. 62/849,417 filed on May 17, 2019. The entireties of these applications are hereby incorporated herein by reference.

BACKGROUND

Many homes, schools, shopping malls, businesses, parks, public spaces, etc. employ some type of video surveillance systems intended to ensure the safety of the people inside and/or around the area being watched. In particular, an interloper with a weapon intending to do harm is a too well known threat for which rapid detection of the weapon is of paramount importance in order to prevent or minimize harm to others in the area. However, the typical video surveillance systems rely on a person monitoring the video stream, usually of multiple cameras, and thus the level of security is dependent on the attentiveness, perception, and level of training of the person monitoring the video output. Typically, the person monitoring the video streams has little or no formal training regarding recognizing and/or detecting a weapon being carried by an interloper. Additionally, the monitoring person may be watching a computer screen showing multiple video streams (four, nine, sixteen, or more) thereby overloading the ability of the person to accurately discern the presence of a weapon and further handicapping the person by presenting them with multiple poor resolution images. Therefore, even if the person monitoring the video streams is well trained, the likelihood that the person will recognize a weapon being carried is severely diminished.

Some systems do not monitor the video streams in real time at all thus rendering the system ineffective for detecting an interloper problem in advance before it turns into an active shooter situation. Furthermore, even with real time viewing of the video streams there may be gaps due to distractions, breaks, fatigue, or other situations.

Therefore, there is a need for a system and/or method that provides constant and unwavering monitoring of security video streams and has the capability to provide accurate detections and assessments while minimizing false alarms. The system and/or method may be integrated with an existing video surveillance system or can be provided as a complete turn-key solution.

SUMMARY

This disclosure generally relates, in various embodiments, to systems and methods for intelligent video surveillance ("IVS"). In certain embodiments, the systems and methods may include processing almost exclusively from video from surveillance cameras; analytics using test videos obtained by using surveillance footage featuring items of interest (such as, but not limited to, a weapon such as a handgun or rifle); uploading specifically recorded testing videos to an analytics engine/deep learning server ("DLS") for managing datasets and training deep learning models; splitting the test videos into frames using the command line utility; annotated with a proprietary set of weapon labels and attributes which separate out labeled objects into subcategories; representing scenes with and without weapons and other objects resembling weapons that could trigger false positive identifications; deploying deep server models on an analytics server and running an object detection inference process on the test videos, and recording the results. These filtered results may be used to analyze model performance by determining which metadata filters produce the highest number of true positives with the lowest number of false positives. The metadata values may be saved and/or used to set minimum and maximum parameters for triggering alerts, thereby greatly reducing false positives while also triggering real-time weapon detection alerts. The results may be filtered by an event duration, such as, but not limited to, >1.0 seconds and a confidence score of 97.5%. The incoming video streams may be preprocessed using, e.g., Background Subtraction, which allows the computer vision algorithms to calibrate a baseline of the camera view and focus on only the foreground, and which reduces the bandwidth needed to transfer data between systems and results in near real-time alerting capabilities.

In an embodiment, the present disclosure provides a method for training an object detection device, the method comprising the steps of: recording a first video stream from a security camera; selecting a set of frames from the first video stream; selecting a subset of frames from the set of frames and inserting a bounding box in each frame of the subset of frames; creating a list of attributes associated with said each frame of the subset of frames; creating a database comprising said each frame of the subset of frames and the associated list of attributes, wherein the database is searchable by at least one attribute of the list of attributes; training a detection model using the database, wherein the training includes varying a first parameter of the detection model; analyzing a second video stream using the detection model to determine a number of true positive events and a number of false positive events, wherein the second video stream is different from the first video stream; creating a dataset of the analysis of the second video stream; and filtering the dataset using a second parameter.

In other embodiments, the first video stream comprises an image of a person carrying an object of interest; the object of interest is a weapon; at least one frame of the subset of frames includes an object of interest; the bounding box circumscribes at least a part of the object of interest; the bounding box is a bounding polygon; at least one of the attributes is associated with an object of interest; the attributes are selected from the group consisting of: color, lighting level, clarity, security camera characteristics, an object of interest type, an orientation of the object of interest, contrast, and combinations thereof.

In another embodiment, the method for training an object detection device further comprises the step of adjusting a location of the bounding box in one of the frames of the subset of frames from a first location to a second location. In other embodiments, the first location and the second location are separated by a predetermined number of pixels.

In another embodiment, the method for training an object detection device further comprises the step of adjusting a size of the bounding box in one of the frames of the subset of frames from a first size to a second size. In other embodiments, the first size of the bounding box comprises a first number of pixels and the second size of the bounding box comprises a second number of pixels different from the first number of pixels; the first parameter is selected from the group consisting of: a number of labels, a number of images, a number of frames, a number of iterations, a max iteration value, a test iteration value, a test interval, a momentum value, a ratio value, a learning rate, a weight decay, and combinations thereof; the second video stream comprises a live video stream or a filtered video stream; the second parameter is selected from the group consisting of: confidence score, event duration, pixel area size, object speed, minimum range of object movement, average object size, and average pixel speed, and combinations thereof.

In another embodiment, the method for training an object detection device further comprises the step of maximizing a difference between the number of true positive events and the number of false positive events, wherein the number of true positive events is greater than the number of false positive events.

In another embodiment, the method for training an object detection device further comprises the step of determining a ratio of true positive events to false positive events ("TP/FP").

In another embodiment, the method for training an object detection device further comprises the step of determining a ratio of false positive events to true positive events ("FP/TP").

In another embodiment, the method for training an object detection device further comprises the steps of: converting FP/TP to a percentage ("% FP/TP"); determining a ratio of % FP/TP to TP/FP; and evaluating the performance of the detection model based at least in part on the ratio of % FP/TP to TP/FP. In other embodiments, the evaluation of the performance of the detection model comprises determining performance metrics; the performance metrics are selected from the group consisting of: number of true positive events, number of false positive events, a score value, an average score value, a label performance value, a score by distance value, and combinations thereof.

In another embodiment, the method for training an object detection device further comprises the step of comparing the evaluated performance of the detection model with a performance of a second detection model.

In another embodiment, the method for training an object detection device further comprises the step of adjusting a location of the insertion of the bounding box in a frame of the subset of frames based on the evaluated performance of the detection model.

In another embodiment, the method for training an object detection device further comprises the step of changing an attribute in the list of attributes based on the evaluated performance of the detection model.

In another embodiment, the method for training an object detection device further comprises the step of adding or deleting an attribute from the list of attributes based on the evaluated performance of the detection model.

In an embodiment, the present disclosure provides a system for training an object detection device, comprising: a recording device for recording a first video stream from a security camera; a processor operatively connected to said recording device, said processor programmed to select a set of frames from the first video stream; said processor further programmed to select a subset of frames from the set of frames and inserting a bounding box in each frame of the subset of frames; said processor further programmed to create a list of attributes associated with said each frame of the subset of frames; a database operatively connected to said processor, wherein said processor populates said database such that said database comprises said each frame of the subset of frames and the associated list of attributes, wherein said database is searchable by at least one attribute of the list of attributes; said processor further programmed to train a detection model using the database, wherein the training includes varying a first parameter of the detection model; said processor further programmed to analyze a second video stream using the detection model to determine a number of true positive events and a number of false positive events, wherein the second video stream is different from the first video stream; said processor programmed to create a dataset of the analysis of the second video stream; and a filter for filtering the dataset using a second parameter.

In an embodiment, the present disclosure provides a non-transitory, machine-readable medium having stored thereon a plurality of executable instructions, the plurality of executable instructions comprising instructions to: record a first video stream from a security camera; select a set of frames from the first video stream; select a subset of frames from the set of frames and inserting a bounding box in each frame of the subset of frames; create a list of attributes associated with said each frame of the subset of frames; create a database comprising said each frame of the subset of frames and the associated list of attributes, wherein the database is searchable by at least one attribute of the list of attributes; train a detection model using the database, wherein the training includes varying a first parameter of the detection model; analyze a second video stream using the detection model to determine a number of true positive events and a number of false positive events, wherein the second video stream is different from the first video stream; create a dataset of the analysis of the second video stream; and filter the dataset using a second parameter.

In an embodiment, the present disclosure provides an intelligent video surveillance (IVS) system able to perform real-time analytics on a live video stream, including at least one video surveillance system module having: a video surveillance camera; a video encoder to encode video gathered by the video surveillance camera; and a video analysis engine coupled to the video surveillance camera to analyze the live video stream gathered by the video surveillance camera and to create data derived from the video, wherein said IVS system is characterized by: said video analysis engine comprising: at least one deep learning model and a database comprises recorded testing videos.

In other embodiments, the IVS system includes a video analysis engine comprising a vision based artificial intelligence software platform server; the recorded testing videos comprise surveillance footage featuring weapons; the recorded testing videos further comprise video footage from game development engines.

In an embodiment, the IVS system of claim 2, further comprises processing means for running an object detection inference process on the testing videos, and means for recording the results. In other embodiments, the processing means further can split the testing videos and the live video stream into frames; the processing means further includes real-time analytic means for analyzing the frames of the live video stream in response to predetermined system criteria; the processing means further includes real-time alerting means for alerting authorities in response to an incident event detected by the results of said analysis from said analytic means analyzing the frames; the processing means further provides situational awareness in response to an incident event detected by the results of said analysis from said analytic means analyzing the frames; the processing means further provides response management in response to an incident event detected by the results of said analysis from said analytic means analyzing the frames; the incident event is a detection of a weapon in a live video stream.

In an embodiment, the present disclosure provides a method for identifying and tracking an incident involving a weapon identified in a video surveillance stream; comprising: providing a real-time video stream; performing real-time analytics on said video stream; detecting an incident involving a weapon in said video stream; and providing a real-time alert to an authority in response said incident. In other embodiments, the performing real-time analytics on said video stream step comprises using at least one deep learning model and a database comprising recorded testing videos; the database comprising recorded testing videos comprises surveillance footage featuring weapons.

In another embodiment, the method for identifying and tracking an incident involving a weapon identified in a video surveillance stream further comprises running an object detection inference process on the testing videos, and recording the results, prior to the step of performing real-time analytics on said video stream.

In another embodiment, the method for identifying and tracking an incident involving a weapon identified in a video surveillance stream further comprises processing the testing video to split it into frames. In other embodiments, the video stream is split into frames, prior to the step of performing real-time analytics on said video stream.

In another embodiment, the method for identifying and tracking an incident involving a weapon identified in a video surveillance stream further comprises camera tuning to maximize object detections and minimize a false positive.

In another embodiment, the method for identifying and tracking an incident involving a weapon identified in a video surveillance stream further comprises input processing to maximize object detections and minimize a false positive.

In another embodiment, the method for identifying and tracking an incident involving a weapon identified in a video surveillance stream further comprises combining edge computing with real-time video analytics to reduce data transfer needs.

Other embodiments, additional features, and advantages of the disclosure will be set forth in the detailed description, claims, and drawings, and in part will be readily apparent to those skilled in the art. It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and together with the description serve to explain the principles and operations of the disclosure.

BRIEF DESCRIPTION OF DRAWINGS

FIGS. 4A and 4B show data representative of a model's progress through a training cycle according to an embodiment of the present disclosure.

DETAILED DESCRIPTION

Figure 1:
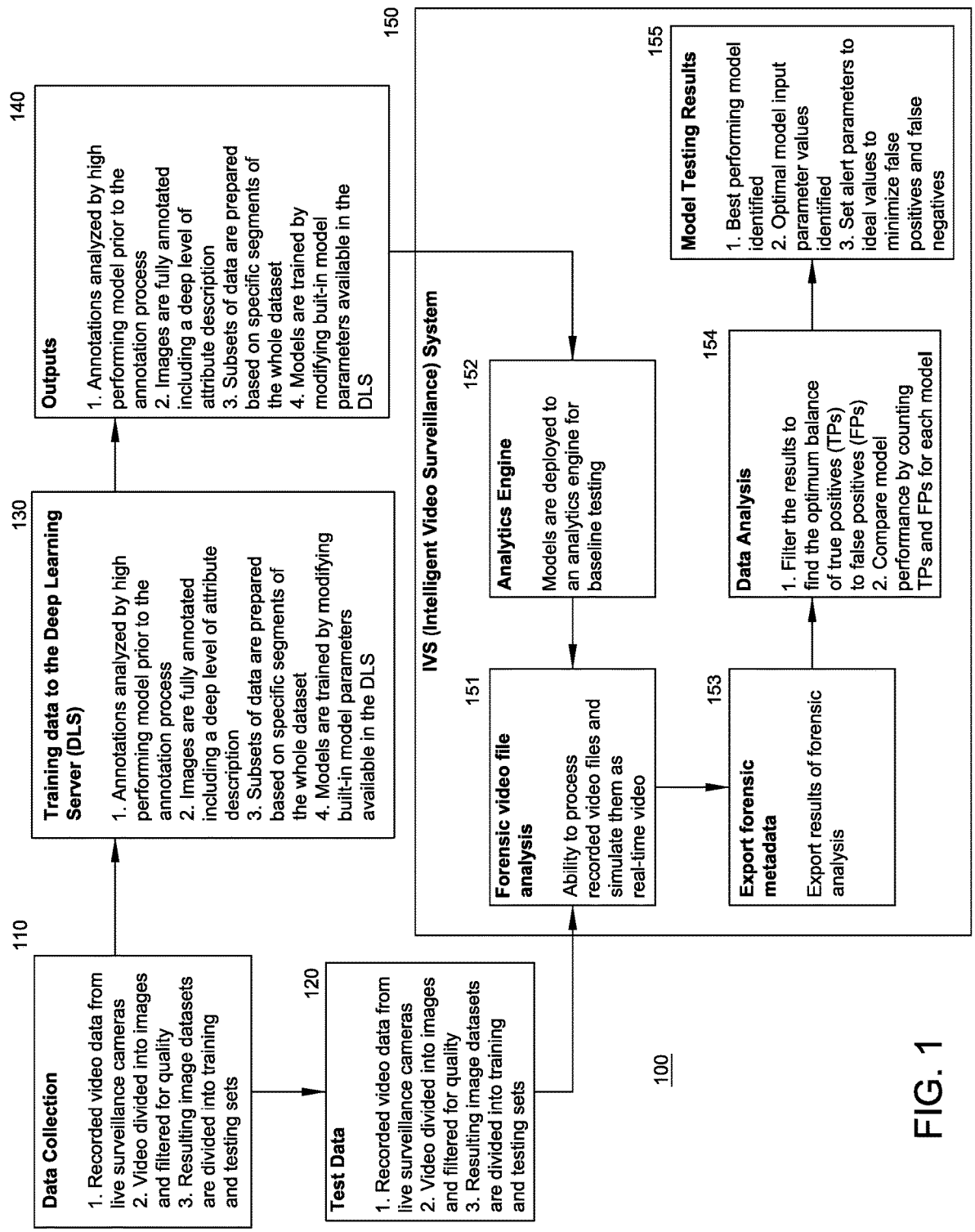
FIG. 1 is a flow chart of a process to detect and/or identify an object of interest according to an embodiment of the present disclosure.

The following description of the present subject matter is provided as an enabling teaching of the present subject matter and its best, currently-known embodiment. Those skilled in the art will recognize that many changes can be made to the embodiments described herein while still obtaining the beneficial results of the present subject matter. It will also be apparent that for some embodiments, some of the desired benefits of the present subject matter can be obtained by selecting some of the features of the present subject matter without utilizing other features. Accordingly, those skilled in the art will recognize that many modifications and adaptations of the present subject matter are possible and may even be desirable in certain circumstances and are part of the present subject matter. Thus, the following description is provided as illustrative of the principles of the present subject matter and not in limitation thereof and may include modification thereto and permutations thereof. While the following exemplary discussion of embodiments of the present subject matter may be directed towards or reference specific systems and/or methods for an intelligent video surveillance system and method, it is to be understood that the discussion is not intended to limit the scope of the present subject matter in any way and that the principles presented are equally applicable to other systems and/or methods for an intelligent video surveillance system and method.

This description of the exemplary embodiments is intended to be read in connection with the accompanying drawings, which are to be considered part of the entire written description. In the description, relative terms such as "lower," "upper," "horizontal," "vertical," "above," "below," "up," "down," "top" and "bottom" as well as derivative thereof (e.g., "horizontally," "vertically," "downwardly," "upwardly," etc.) should be construed to refer to the orientation as then described or as shown in the drawing under discussion. These relative terms are for convenience of description and do not require that the apparatus be constructed or operated in a particular orientation.

Those skilled in the art will further appreciate that many modifications to the exemplary embodiments described herein are possible without departing from the spirit and scope of the present subject matter. Thus, the description is not intended and should not be construed to be limited to the examples given but should be granted the full breadth of protection afforded by the appended claims and equivalents thereto.

With reference to the figures where like elements have been given like numerical designations to facilitate an understanding of the present subject matter, various embodiments of a system and method for an intelligent video surveillance system and method are described.

The present disclosure provides advantages over prior art security/detection systems by providing one or more of: (a) situational awareness, critical response management, and/or real-time alerting initiated by detection of weapon in live video streams; (b) systems and methods for tracking objects geospatially through identifications in video surveillance streams; (c) systems and methods for camera tuning and input processing to maximize object detections and minimize false positives; and (d) systems and methods for combining edge computing with real-time video analytics to reduce data transfer needs.

Data Collection

Most object detection models are created with generic, readily available data that is harvested from online sources. In the case of computer vision models, there are several open-source datasets (i.e., ImageNet and Google's Open Image Dataset) that feature mediocre quality images that are not typical of realistic situations where actual particular objects need to be detected.

The available image data suitable for training the disclosed weapon detection deep learning models is very limited and therefore not useful for actual detection situations. The majority of data available online often displays up-close, profile views of weapons, which is not representative of the view of weapons in typical surveillance video. In the unique case of processing video almost exclusively from surveillance cameras, the data collection process may be further complicated due to the specific distances and camera angles that need to be represented in the dataset to enable the dataset to be used to train high-performing models. Low quality image inputs generally lead to low performing deep learning models. Thus, the inventors made the decision early on in development that other sources of image data would be needed in order to train models capable of high accuracy in real-world environments.

In certain embodiments, potential sources for the data were identified. One entailed recording custom surveillance video footage featuring actual weaponry, and another included exploring the use of free-to-use, high-quality game development engines such as, e.g., Unreal Engine (the engine used to create Fortnite and many other modern, highly-detailed graphic games) to create photo-realistic scene replications of actual camera views from potential customers' surveillance cameras.

In various embodiments, hundreds of hours of surveillance footage (videos and/or still pictures) were recorded, focusing on capturing as many different scenarios as possible. This surveillance footage may be used for training and testing various deep learning models as discussed below. Variables that were taken into account while recording training data include, but are not limited to: time of day (dawn/dusk/night, shade/overcast/full sun, etc.), type of weapon used (a wide range of different pistols and rifles were recorded), and the position of the weapon (e.g., movement speed, distance, orientation, weapon visibility, etc.) Additionally, the following exemplary, non-exhaustive, list of factors for the surveillance footage that affect object detection were analyzed and/or tested:
Environmental Factors:
  Time of day relating to light levels and potential for shadows (steep sun angles at dawn/dusk);
  Weather conditions (fog, rain, snow, overcast, full sun).
Camera and Hardware Factors:
  Camera filters and lighting settings (day vs night for infrared—iris, contrast, color vs black and white, etc.);
  Resolution (should represent a range of current standards, 1440p, 1080p, 720p, 480p, etc.);
  Frame rate (only matters if testing on video);
  Detection frame rate (only matters if testing on video);
  Lens type (wide angle, fisheye, standard);
  Noise (dust/condensation/glare on lens);
  Height and angle of camera (affects the visible orientation of the gun—average security camera at 10-12 ft).
Gun Factors:
  Size of gun (pixel area can be used as an approximation of distance from camera—would be good to define standards for weapon sizes at various distances;
  Visibility (full, partially concealed, fully concealed, holstered, partially off camera);
  Material concealing the weapon (thickness/material of clothing/container that may be partially or fully obscuring view—important for solutions that attempt to detect fully concealed weapons);
  Orientation (vertical pointed up/down, angle up/down, profile view, top down view etc.);
  Color (metallic, black, blue, other color/materials);
  Contrast to clothing/background (in conjunction with other factors, i.e.—black weapon on black shirt in full sun);
  Specific gun models and/or categories: for long guns, assault rifle, semi-automatic rifle, AR-15 style rifle, AK-47 rifle, hunting rifle, long-range rifle, bullpup-style, shotgun, etc.; and for pistols—revolver, semi-auto, 3D-printed, etc.

Once recorded, the surveillance footage taken was split into frames using, in a non-limiting embodiment, the command line utility, FFmpeg. The individual frames were then reviewed for further processing. Experimentation with choosing various numbers of frames per second (fps) of video (e.g., in an embodiment, for an exemplary 30 fps video, only 2 of the 30 frames recorded every second are chosen for further processing) revealed that processing too many frames led to datasets of unmanageable size as well as causing overfitting/overtraining of a model due to training the model with large quantities of highly similar images. In various embodiments, the number of frames chosen for 1 second of video is less than 5, between 2-5 (inclusive), between 1-4 (inclusive), between 1-3 (inclusive), between 1-2 (inclusive), and all subranges therebetween. In an embodiment, the frames that are chosen are those that include the highest "quality" images based on one or more of the following factors: (1) visibility of the item of interest, (2) clarity of the image in the frame, (3) clarity of the item of interest, (4) orientation of the item of interest, (5) viewing angle of the camera taking the image, and combinations thereof.

The chosen video frames are then processed to include bounding boxes and/or bounding polygons and labels. In an embodiment, a bounding box is rectangular in shape. In other embodiments, a bounding box may be polygonal in shape. Bounding boxes are added to the chosen frames where the bounding boxes typically surround (fully or substantially completely) an object of interest, such as a rifle, pistol, or other weapon. Bounding polygons (such as a polygon that generally traces the outline of an object of interest) may be added to the chosen frames either instead of, or in addition to, a bounding box. Additionally, the chosen frames may be annotated with a unique set of weapon labels and/or attributes which may separate out labeled objects into subcategories and allow the deep learning models to identify similar weapons with different characteristics that reflect how those weapons are represented and later identified. As a non-limiting example, a handgun may be assigned the label "pistol" and may have a variety of attributes assigned to that label such as, but not limited to, color, the presence or absence of aiming sights, length, in or out of a holster, orientation, how the pistol is being held/pointed, etc.

Deep Learning

In an embodiment, datasets are uploaded to a deep learning server which is a platform for managing datasets and training deep learning models. A typical deep learning server offers a number of model parameters which can be adjusted to optimize model performance. Examples of parameters include, but are not limited to, max iteration, test iteration, test interval, learning rate, weight decay, momentum, ratio, and combinations thereof. For example, the max iteration parameter sets the number of times a model runs through a particular image.

The inventors have experimented with hundreds of combinations of parameter values and have developed a method of testing model performance that is independent of the accuracy output indicated by the deep learning server since the inventors' testing revealed that the indicated accuracy output by the deep learning server does not always correlate with actual model performance. In certain embodiments, the disclosed testing process comprises uploading specifically recorded testing videos to the deep learning server. The testing videos were designed, produced, and recorded by the inventors to push the limits of the model by representing scenes with and without weapons as well as scenes which include other objects that in some aspects might resemble weapons that could trigger false positives. The testing videos are produced and processed to incorporate a wide variety of scenarios, variables, and factors (each as discussed above) so as to provide a comprehensive and thorough basis for model training and testing. In an embodiment, training/testing videos are produced and processed to mimic situations that may be encountered at a particular customer's site, which may include obtaining the testing videos using the particular video cameras and/or camera installation at the customer's site. In an embodiment, test training/testing videos include videos that do not include an item of interest, such as a weapon.

The model may be deployed on the deep learning server and an object detection inference process is run on the test videos. In an embodiment, the results of the object detection inference process are recorded.

The object detection inference process results may be analyzed to identify one or more high-performing models. A high performing model is one that provides very few, or no, false positive identifications and as many true positive identifications as possible. Various criteria can be used to classify a model as a high performing model. In an embodiment, a high performing model provides one or more of the following results: a ratio of true positives to false positives of 10 or greater, 20 or greater, 50 or greater, and all subranges therebetween; a maximum number of false positives of 5 or less, 3 or less, 1 or less, and all subranges therebetween. In an embodiment, each high-performing model is further tested by exporting the model from the deep learning server and integrating it into an IVS server. Each of these high-performing models was used to analyze pre-recorded videos to measure performance. The testing videos were not used in the model training data. The output of the testing video inference replicates the output of real-time inference with metadata including, for example, object size, object speed, event duration, movement distance, movement direction, color, background contrast, and confidence score.

In an embodiment, the metadata output from these testing runs may be exported using a program which formats the metadata output into an Excel file. The metadata output is analyzed to identify false positives vs. true positives and filter the results. These filtered results are used to analyze model performance by determining, in an embodiment, which metadata filters produce the highest number of true positives with the lowest number of false positives.

In an embodiment, the metadata output values are saved and used to determine the minimum and maximum parameters for triggering alerts. This allows the presently disclosed systems and methods to greatly reduce false positives while also triggering real-time weapon detection alerts. In an embodiment, a compound weapon detection alert may be required in order to transmit an emergency signal to, e.g., a law enforcement authority, where a compound alert is a weapon detection alert triggered based on input from two or more separate input devices (e.g., video cameras).

As a non-limiting example, after testing Model A in a deep learning server with Test Video 1, there was only 1 false positive in the video (average is –8 for Test Video 1). Because of the low rate of false positives, a decision was made to further test Model A with testing videos. Model A was then exported from the deep learning server and deployed on the IVS server. A video inference test was run on Test Video 2 (which is different than Test Video 1) and the metadata output results were exported using the export program discussed above. In an embodiment, the metadata output results were filtered by an event duration of, for example, >1.0 seconds and a confidence score of, for example, 97.5%. In an embodiment, the duration is between about 0.1 sec and about 1.0 sec and the confidence score is between about 97.5% and about 99.95%. The metadata output results show that there would be 8 true positive hits and only 1 false positive hit that met those filter thresholds. Multiple filter scenarios are analyzed to determine the best configuration specific to each model that is trained.

Preprocessing

In an embodiment, when deploying deep learning models in real time, the IVS server handles the preprocessing of incoming video streams. The IVS server may offer, for example, Background Subtraction which allows the computer vision algorithms to calibrate a baseline of the camera view and focus on only the foreground, which typically may be the most important portion of the incoming video stream. This reduces the bandwidth needed to transfer data between systems and results in near real-time alerting capabilities. This may also provide a foundation for edge computing and the use of smart sensors.

FIG. 1 shows a flow chart of a process 100 according to an embodiment of the present disclosure. The method 100 may be used to detect and/or identify one or more items of interest (such as, but not limited to, a weapon such as a pistol or rifle). At block 110 video data is collected/recorded for training and testing/verification purposes. In an embodiment, the recorded video data is taken from actual security cameras in real-life environments, as discussed above. Alternatively, the recorded video data is taken from an artificially-created environment that simulates a real scenario. Additionally, security cameras are typically situated so as to have a particular viewpoint, such as, for a non-limiting example, a viewpoint from a position 10-12 feet above ground level. This viewpoint results in images that are encountered in typical security footage and which are not found in standard image databases. The viewpoint of the camera may be modified to closely simulate the actual camera deployment at a particular site.

The recorded videos are split into frames/images and the frames/images are uploaded into the deep learning server 130. In an embodiment, a few key/chosen frames/images, as discussed above, are uploaded to the deep learning server, where the key frames/images are those that appear to contain a possible item of interest, such as a weapon. The number of key frames may vary depending on a variety of factors, such as those factors discussed above, and may be 1-2 frames in number, 1-5 frames in number, 1-10 frames in number, and all subranges therebetween. In an embodiment, the videos recorded in block 110 are split into two categories. The first category are videos that are sent to the deep learning server for model training. The second category are testing videos, as discussed below. In an embodiment, approximately 80% of the videos are placed in the first category and approximately 20% of the videos are placed in the second category, although the present disclosure contemplates that the division (or split) between first and second category videos is configurable. The percentage of videos placed in the first category may be between 90% and 70%, between 80% and 60%, between 85% and 50%, less than 50%, and all subranges therebetween.

A model architecture (e.g., a program with a string of algorithms) is run through the deep learning server a number of times, each time resulting in a different "model." The model architecture may be a commercially-available program or, in an embodiment, the model architecture may be changed to account for the particular situation and/or problem to be solved. The different models are the result of the different runs of the model architecture through the deep learning engine. In an embodiment, the model architecture makes an 80/20 split, as discussed above, for videos in the first and second category, respectively. However, the videos that are applied to the split are random. Put another way, in a first run, the 80% of videos that are put in the first category are not all the same as the 80% of videos that are put in the first category in a second run. Thus, in the first run and the second run, the model architecture is trained on a different set of videos which result in different models (which may perform differently from each other). Varying the split between runs also results in different models.

The second category are testing videos which, at block 120, may be converted to MP4 videos. These testing/verification videos are used for forensic video file analysis/video inference testing ("VIT") at block 151. In an embodiment, it is important to not intermingle the first and second category of videos so as to avoid skewing the subsequent test results.

At block 130 the frames/images for modeling are uploaded to the deep learning server. The number of images that are uploaded may be 1-1000, 500-5000, 10-10,000, 1-10,000, and all subranges therebetween. In an embodiment, more than 10,000 images may be uploaded. Bounding boxes/polygons may be drawn and/or edited (e.g., smoothed, cleaned-up, revised, altered, removed, added, etc.) around items of interest in one or more of the images. The edited frames/images are then used to train detection models which may include modifying the parameters available in the deep learning server, as discussed above. The parameters are adjusted to improve the performance of the detection model, such as, for example, how fast or slow the detection model learns or how many times the detection model analyzes a particular frame/image. The trained models are analyzed to identify one or more high-performing models. In an embodiment, the performance of a model being tested is compared to the performance of one or more previous models to determine whether or not the model being tested is an improvement over the one or more previous models. If the model being tested outperforms the one or more previously tested models during the initial testing, the model being tested is then exported and deployed for more detailed testing in IVS.

In embodiments, the models are trained using a very diverse data set/content of training videos. The data set may include, but is not limited to, the use of multiple images of a particular weapon, multiple different weapons, multiple environmental scenes (e.g., sunny, overcast, rainy, snowy, etc.), multiple lighting conditions (e.g., direct sunlight, indirect sunlight, artificial lighting at night—lamp posts, flood lights, infrared, etc.), various distances from the recording video camera, various viewing angles of the recording video camera, skin tone of potential shooters hand, hand position of potential shooter, height of potential shooter, speed of advance of the potential shooter, type of clothing worn by potential shooter, orientation of weapon (e.g., held vertical, horizontal, on the shoulder, at port arms, in an aiming position, etc.)

At block 140, in an embodiment, each high-performing model is output for further testing using IVS at block 150. The high-performing models are exported from the deep learning server and integrated into the IVS at block 152, as described above.

At block 151, in an embodiment, the video inference testing test videos from block 120 are run to analyze the high-performing models from block 152. The analysis may include going through the testing videos frame-by-frame for those frames which include a detection to identify where in a frame an object of interest, e.g., a weapon, appears. In an embodiment, the video inference test runs comprise one or more of the testing videos that were not used in the deep learning server. The output of a video inference testing job replicates the output of real-time inference with metadata including object size, object speed, event duration, and confidence score, among other parameters. At block 153, the video inference output is exported and, in an embodiment, the database exporting tool is used to format the metadata output into an Excel file.

In an embodiment, feedback may be employed to further refine a model. For example, a video may be taken of a test situation for a trained model. That video may be used to retrain the model. In an embodiment, the video of the test situation may be added to the existing set of training videos for the trained model and the trained model may be retrained using the expanded set of training videos. In an embodiment, the retraining procedure may only use the video of the test situation. In an embodiment, the retraining procedure may only use the video of the test situation combined with a subset of the set of training videos, where the subset is 75% of the set, 50% of the set, between 25-75% of the set, less than 25% of the set, between 10% and 90% of the set, and all subranges therebetween.

At block 154, the metadata output is analyzed to identify false positive vs. true positives and filter the results. In an embodiment, the filter or filters that may be used may be selected from the group of object size, object speed, event duration, movement distance, movement direction, color, background contrast, and confidence score. In an embodiment, Event Duration is the time duration in which an "event" (e.g., an appearance of an item of interest, such as a weapon) occurs. In certain embodiments, the Event Duration is at least 1 sec., at least 2 sec., at least 5 sec., between 1-10 sec., and all subranges therebetween. In an embodiment, the Confidence Score is at least 97%. In certain embodiments, the Confidence Score is in the range from about 96% to about 98%, from about 95% to about 99%, from about 94% to about 99%, and all subranges therebetween. In an embodiment, the Confidence Score is an output value from the inference process, such that an image input to the deep learning engine is analyzed and the deep learning engine responds with how confident it is that the object it identified matches the criteria for detection. In an embodiment, the Average Object Size is determined from the number of pixels within a bounding box/polygon around the object (e.g., an item of interest, such as a weapon). In an embodiment, the Average Pixel Speed is a determination of how fast the item of interest moves from one position in one frame to another position in another frame.

In an embodiment, the metadata detection analysis may include Inference output is analyzed and detections are correlated with database composition to guide future training experiments.

The filtered results may be used to analyze model performance by determining which metadata filters produce the highest amount of true positives with the lowest amount of false positives. At block 155, model testing results, the metadata output values are saved and used to determine the minimum and maximum parameters for triggering alerts. Additionally, the IVS is configured using the determined parameters and the top performing model is designated as the model to be run by the IVS.

In an embodiment, the process 100 may run on an intelligent video surveillance system (IVS System), which includes one or more microprocessors and/or a memory device. In an embodiment, the IVS System is able to analyze and/or detect differing environmental conditions/characteristics in real-time surveillance video. This may be accomplished, in an embodiment, by a dedicated environmental sensor that sends a signal to the microprocessor. Upon receipt of the signal, which is representative of an analyzed and/or detected environmental condition/characteristic (such as, but not limited to, amount of light, amount of ambient light, time of day/night, intensity of precipitation, etc.), the microprocessor can dynamically select a situation-specific model (such as a neural network model) from an existing set of models to perform the inference and/or identification and/or detection function on the real-time surveillance video.

As a simplified, non-limiting example, the IVS System may include two separate models where the first model is trained using only video and images captured during daylight and the second model is trained using only video and images captured during the night under infrared lighting. Incoming video to be analyzed is pre-processed to determine whether the lighting parameters correspond to a day or a night setting. In an embodiment, the pre-processing may be based on a signal from an environmental sensor. In an embodiment, the pre-processing may be based on an analysis of just the incoming video (e.g., by comparing the average intensity value of a representative number of pixels in a frame of the incoming video to a threshold value saved in a memory device.) If the pre-processing determines that the incoming video is being taken during the day, then the IVS System automatically selects the first model. If the pre-processing determines that the incoming video is being taken during the night, then the IVS System automatically selects the second model.

In another embodiment, the microprocessor may receive a signal representative of the environmental conditions and/or an environmental characteristic in which the real-time surveillance video is currently operating. The signal may come from a weather station, a website feed, such as an RSS feed, or other similar input.

In a further embodiment, the IVS System may include a motion sensor to operate the real-time video surveillance camera.

In a further embodiment, the process 100 and/or the functionality of the IVS System discussed above may be embodied on a non-transitory, machine-readable medium having stored thereon a set of executable instructions to perform the process 100 and/or the functionality of the IVS System.

Figure 2:
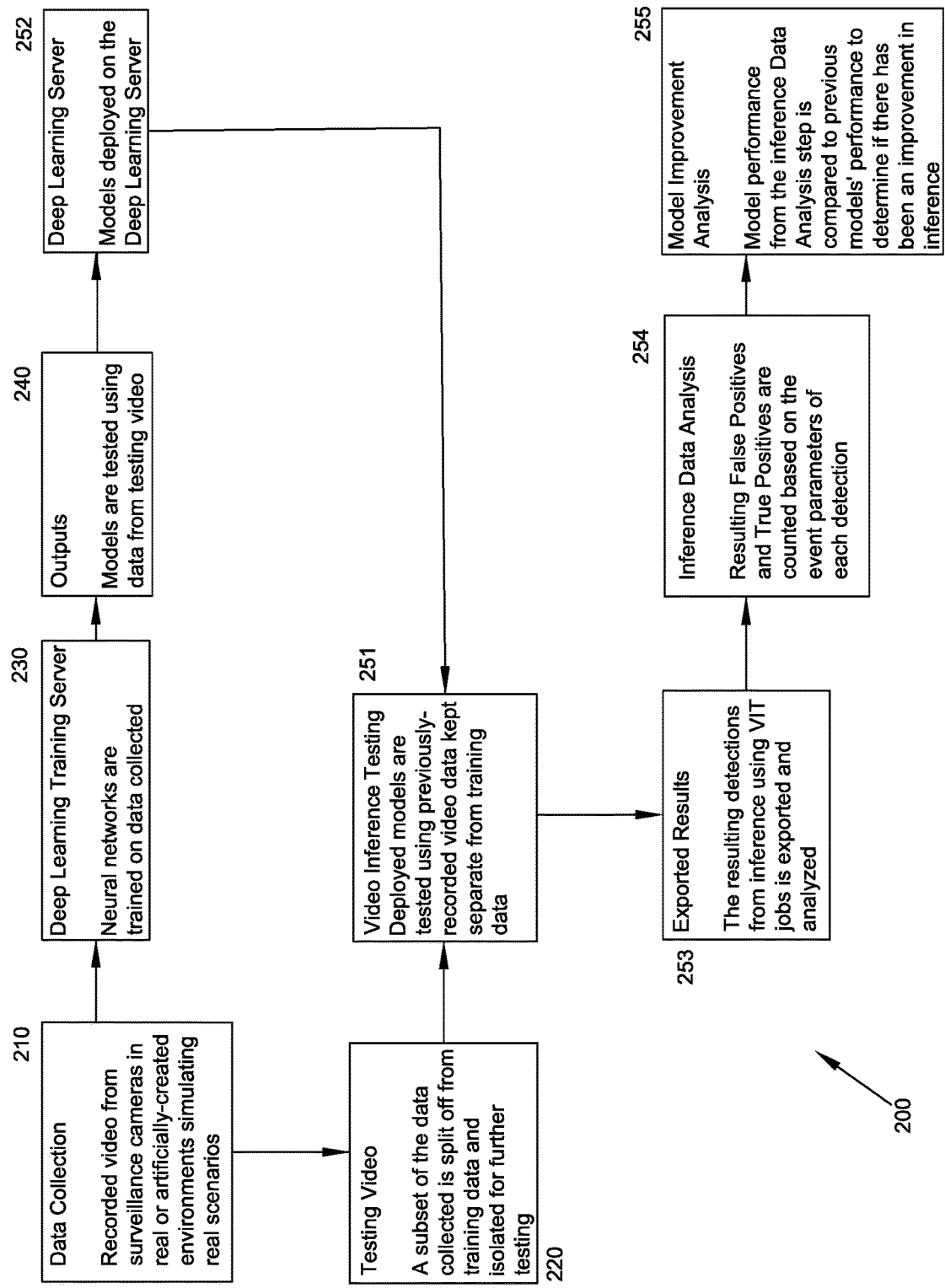
FIG. 2 is a flow chart of another process to train, detect, and/or identify an object of interest according to an embodiment of the present disclosure.

FIG. 2 shows a flow chart of a process 200 according to another embodiment of the present disclosure. The method 200 may be used to detect and/or identify one or more items of interest (such as, but not limited to, a weapon such as a pistol or rifle). At block 210 video data may be collected/recorded for training and testing/verification purposes. In an embodiment, the recorded video data is taken from actual security cameras in real-life environments, as discussed above. Alternatively, the recorded video data is taken from an artificially-created environment that simulates a real scenario. Additionally, security cameras are typically situated so as to have a particular viewpoint, such as, for a non-limiting example, a viewpoint from a position 10-12 feet above ground level. This viewpoint results in images that are encountered in typical security footage and which are not found in standard image databases. In some embodiments, the video cameras are situated as they are at a particular client's site.

The recorded videos may be split into frames/images and the frames/images are uploaded into the deep learning training server 230, where, e.g., neural networks are trained on the collected data. In an embodiment, a few key/chosen frames/images, as discussed above, are uploaded to the deep learning server, where the key frames/images are those that appear to contain a possible item of interest, such as a weapon. The number of key frames may vary depending on a variety of factors, such as those factors discussed above, and may be 1-2 frames in number, 1-5 frames in number, 1-10 frames in number, and all subranges therebetween. In an embodiment, the videos recorded in block 210 may be split into two categories. The first category are videos that are sent to the deep learning training server for model training. In an embodiment, approximately 80% of the videos are placed in the first category and approximately 20% of the videos are placed in the second category, although the present disclosure contemplates that the division (or split) between first and second category videos is configurable. The percentage of videos placed in the first category may be between 90% and 70%, between 80% and 60%, between 85% and 50%, less than 50%, and all subranges therebetween.

A model architecture (i.e., a program with a string of algorithms) is run through the deep learning training server a number of times, each time resulting in a different "model." The model architecture may be a commercially-available program or, in an embodiment, the model architecture may be changed to account for the particular situation and/or problem to be solved. The different models are the result of the different runs of the model architecture through the deep learning engine. In an embodiment, the model architecture makes an 80/20 split, as discussed above, for videos in the first and second category, respectively. However, the videos that are applied to the split are random. Put another way, in a first run, the 80% of videos that are put in the first category are not all the same as the 80% of videos that are put in the first category in a second run. Thus, in the first run and the second run, the model architecture is trained on a different set of videos which result in different models (which may perform differently from each other). Varying the split between runs also results in different models.

The second category are testing videos which, at block 220, may be converted to MP4 videos. These testing/verification videos are used for video inference testing at block 251. In an embodiment, it is important to not intermingle the first and second category of videos so as to avoid skewing the subsequent test results.

At block 230 the frames/images for modeling are uploaded to the deep learning training server. The number of images that are uploaded may be 1-1000, 500-5000, 10-10,000, 1-10,000, and all subranges therebetween. In an embodiment, more than 10,000 images may be uploaded. Bounding boxes/polygons may be drawn and/or edited (e.g., smoothed, cleaned-up, revised, altered, removed, added, etc.) around items of interest in one or more of the images. The edited frames/images are then used to train detection models which may include modifying the parameters available in the deep learning training server, as discussed above. The parameters are adjusted to improve the performance of the detection model, such as, for example, how fast or slow the detection model learns or how many times the detection model analyzes a particular frame/image. The trained models are analyzed to identify one or more high-performing models. In an embodiment, the performance of a model being tested is compared to the performance of one or more previous models to determine whether or not the model being tested is an improvement over the one or more previous models. If the model being tested outperforms the one or more previously tested models during the initial testing, the model being tested is then exported and deployed for more detailed testing a deep learning server.

The models are trained using a very diverse data set/content of training videos. The data set may include, but is not limited to, the use of multiple images of a particular weapon, multiple different weapons, multiple environmental scenes (e.g., sunny, overcast, rainy, snowy, etc.), multiple lighting conditions (e.g., direct sunlight, indirect sunlight, artificial lighting at night—lamp posts, flood lights, infrared, etc.), various distances from the recording video camera, various viewing angles of the recording video camera, skin tone of potential shooters hand, hand position of potential shooter, height of potential shooter, speed of advance of the potential shooter, type of clothing worn by potential shooter, orientation of weapon (e.g., held vertical, horizontal, on the shoulder, at port arms, in an aiming position, etc.)

At block 240, each high-performing model is output for further testing on the deep learning server at block 252, as described above.

At block 251, the video inference test videos from block 220 are run to analyze the high-performing models from block 252. The analysis includes going through the testing videos frame-by-frame for those frames which include a detection to identify where in a frame a weapon or object of interest appears. In an embodiment, the video inference test runs comprise one or more of the testing videos that were not used in the deep learning server. The output of a video inference test job replicates the output of real-time inference with metadata including object size, object speed, event duration, and confidence score, among other parameters. At block 253, the video inference test output is exported and, in an embodiment, the data export tool is used to format the metadata output into an Excel file or other file.

In an embodiment, feedback may be employed to further refine a model. For example, a video may be taken of a test situation for a trained model. That video may be used to retrain the model. In an embodiment, the video of the test situation may be added to the existing set of training videos for the trained model and the trained model may be retrained using the expanded set of training videos. In an embodiment, the retraining procedure may only use the video of the test situation. In an embodiment, the retraining procedure may only use the video of the test situation combined with a subset of the set of training videos, where the subset is 75% of the set, 50% of the set, between 25-75% of the set, less than 25% of the set, between 10% and 90% of the set, and all subranges therebetween.

At block 254, the metadata output is analyzed to identify false positive vs. true positives and filter the results. In an embodiment, false positives and true positives are counted based on the event parameters of each detection including, e.g., object size, object speed, event duration, movement distance, movement direction, color, background contrast, and confidence score. Other applicable event parameters are contemplated by the present disclosure. In another embodiment, the filters that may be used are selected from the group of object size, object speed, event duration, movement distance, movement direction, color, background contrast, and confidence score. In an embodiment, Event Duration is the time duration in which an "event" (e.g., an appearance of an item of interest, such as a weapon, until the item of interest no longer appears) occurs. In certain embodiments, the Event Duration is at least 1 sec., at least 2 sec., at least 5 sec., between 1-10 sec., and all subranges therebetween. In an embodiment, the Confidence Score is at least 97%. In certain embodiments, the Confidence Score is in the range from about 96% to about 98%, from about 95% to about 99%, from about 94% to about 99%, and all subranges therebetween. In an embodiment, the Confidence Score is an output value from the inference process, such that an image input to the deep learning engine is analyzed and the deep learning engine responds with how confident it is that the object it identified matches the criteria for detection. In an embodiment, the Average Object Size is determined from the number of pixels within a bounding box around the object (e.g., an item of interest, such as a weapon). In an embodiment, the Average Pixel Speed is a determination of how fast the item of interest moves from one position in one frame to another position in another frame.

The filtered results may be used to analyze model performance by determining which metadata filters produce the highest number of true positives with the lowest number of false positives. At block 255, the metadata output values are saved and used to determine the minimum and maximum parameters for triggering alerts. Additionally, the deep learning server is configured using the determined parameters and the top performing model is designated as the model to be run by the deep learning server. Results, data, etc. from the various steps in the methodology may be displayed on a computer screen, a mobile device screen, or similar video or still image display device.

In an embodiment, the process 200 may run on an intelligent video surveillance system (IVS System), which includes one or more microprocessors and/or a memory device. In an embodiment, the IVS System is able to analyze and/or detect differing environmental conditions/characteristics in real-time surveillance video. This may be accomplished, in an embodiment, by a dedicated environmental sensor that sends a signal to the microprocessor. Upon receipt of the signal, which is representative of an analyzed and/or detected environmental condition/characteristic, the microprocessor can dynamically select a situation-specific model (such as a neural network model) from an existing set of models to perform the inference and/or identification and/or detection function on the real-time surveillance video.

As a simplified, non-limiting example, the IVS System may include two separate models where the first model is trained using only video and images captured during daylight and the second model is trained using only video and images captured during the night under infrared lighting. Incoming video to be analyzed is pre-processed to determine whether the lighting parameters correspond to a day or a night setting. In an embodiment, the pre-processing may be based on a signal from an environmental sensor. In an embodiment, the pre-processing may be based on an analysis of just the incoming video (e.g., by comparing the average intensity value of a representative number of pixels in a frame of the incoming video to a threshold value saved in a memory device.) If the pre-processing determines that the incoming video is being taken during the day, then the IVS System automatically selects the first model. If the pre-processing determines that the incoming video is being taken during the night, then the IVS System automatically selects the second model.

In another embodiment, the microprocessor may receive a signal representative of the environmental conditions and/or an environmental characteristic in which the real-time surveillance video is currently operating. The signal may come from a weather station, a website feed, such as an RSS feed, or other similar input.

In a further embodiment, the IVS System may include a motion sensor to operate the real-time video surveillance camera.

In a further embodiment, the process 200 and/or the functionality of the IVS System discussed above may be embodied on a non-transitory, machine-readable medium having stored thereon a set of executable instructions to perform the process 200 and/or the functionality of the IVS System.

Figure 3:
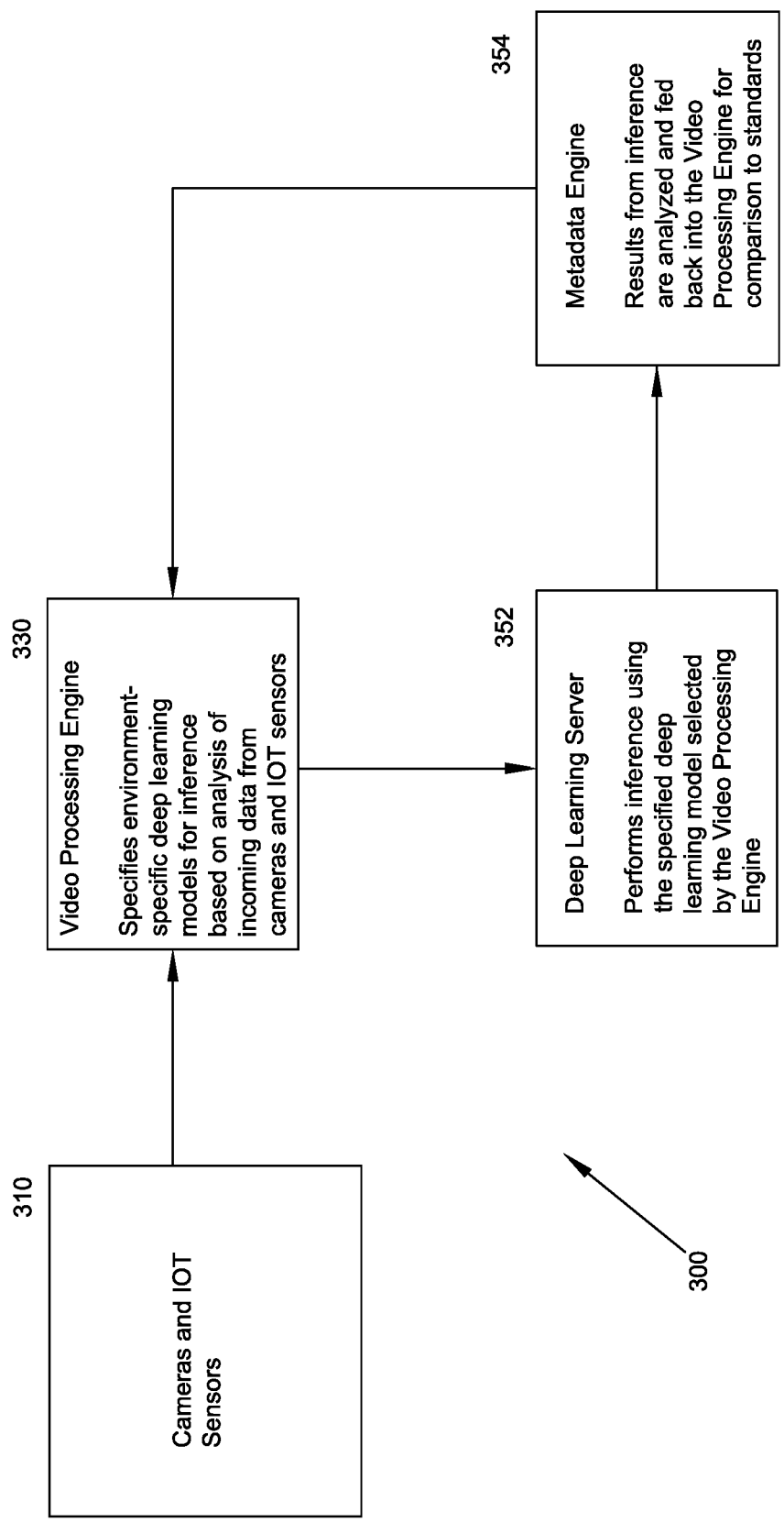
FIG. 3 is a flow chart of yet another process to train, detect, and/or identify an object of interest according to an embodiment of the present disclosure.

FIG. 3 shows a flow chart of a process 300 according to another embodiment of the present disclosure. The method 300 may be used to detect and/or identify one or more items of interest (such as, but not limited to, a weapon such as a pistol or rifle). At block 310 video data is collected/recorded for training and testing/verification purposes. In an embodiment, the recorded video data is taken from actual security cameras and/or cameras associated with devices in the Internet of Things ("JOT") in real-life environments, as discussed above. Alternatively, the recorded video data may be taken from actual security cameras and/or cameras associated with devices in the IOT in an artificially-created environment that simulates a real scenario. Additionally, security cameras are typically situated so as to have a particular viewpoint, such as, for a non-limiting example, a viewpoint from a position 10-12 feet above ground level or a viewpoint encountered at a client site to be monitored. This viewpoint results in images that are encountered in typical security footage and which are not found in standard image databases. TOT cameras will typically have a viewpoint from a similarly-situated TOT device in a real-life environment.

The recorded videos are split into frames/images and the frames/images are uploaded into the video processing engine ("VPE") 330, where e.g., neural networks are trained on the collected data. In an embodiment, a few key/chosen frames/images, as discussed above, are uploaded to the deep learning server, where the key frames/images are those that appear to contain a possible item of interest, such as a weapon. The number of key frames may vary depending on a variety of factors, such as those factors discussed above, and may be 1-2 frames in number, 1-5 frames in number, 1-10 frames in number, and all subranges therebetween. In an embodiment, the videos recorded in block 310 may be split into two categories. The first category are videos that are sent to the deep learning training server for model training. In an embodiment, approximately 80% of the videos are placed in the first category and approximately 20% of the videos are placed in the second category, although the present disclosure contemplates that the division (or split) between first and second category videos is configurable. The percentage of videos placed in the first category may be between 90% and 70%, between 80% and 60%, between 85% and 50%, less than 50%, and all subranges therebetween.

A model architecture (i.e., a program with a string of algorithms) may be run through the VPE a number of times, each time resulting in a different "model." The model architecture may be a commercially-available program or, in an embodiment, the model architecture may be changed to account for the particular situation and/or problem to be solved. The different models are the result of the different runs of the model architecture through the VPE. In an embodiment, the model architecture makes an 80/20 split, as discussed above, for videos in the first and second category, respectively. However, the videos that are applied to the split are random. Put another way, in a first run, the 80% of videos that are put in the first category are not all the same as the 80% of videos that are put in the first category in a second run. Thus, in the first run and the second run, the model architecture is trained on a different set of videos which result in different models (which may perform differently from each other). Varying the split between runs also results in different models.

The second category are testing videos which may be converted to MP4 videos. These testing/verification videos are used for input into the deep learning server ("DLS") at block 352. In an embodiment, it is important to not intermingle the first and second category of videos so as to avoid skewing the subsequent test results.

At block 330 the frames/images for modeling are uploaded to the VPE. The number of images that are uploaded may be 1-1000, 500-5000, 10-10,000, 1-10,000, and all subranges therebetween. In an embodiment, more than 10,000 images may be uploaded. Bounding boxes/polygons may be drawn and/or edited (e.g., smoothed, cleaned-up, revised, altered, removed, added, etc.) around items of interest in one or more of the images. The edited frames/images may then be used to train detection models which may include modifying the parameters available in the deep learning training server, as discussed above. The parameters are adjusted to improve the performance of the detection model, such as, for example, how fast or slow the detection model learns or how many times the detection model analyzes a particular frame/image. The trained models are analyzed to identify one or more high-performing models. In an embodiment, the performance of a model being tested is compared to the performance of one or more previous models to determine whether or not the model being tested is an improvement over the one or more previous models. If the model being tested outperforms the one or more previously tested models during the initial testing, the model being tested is then exported and deployed for more detailed testing a deep learning server.

In an embodiment, the models are trained using a very diverse data set/content of training videos. The data set may include, but is not limited to, the use of multiple images of a particular weapon, multiple different weapons, multiple environmental scenes (e.g., sunny, overcast, rainy, snowy, etc.), multiple lighting conditions (e.g., direct sunlight, indirect sunlight, artificial lighting at night—lamp posts, flood lights, infrared, etc.), various distances from the recording video camera, various viewing angles of the recording video camera, skin tone of potential shooters hand, hand position of potential shooter, height of potential shooter, speed of advance of the potential shooter, type of clothing worn by potential shooter, orientation of weapon (e.g., held vertical, horizontal, on the shoulder, at port arms, in an aiming position, etc.), and other pertinent data The output of block 330 is input to the deep learning server at block 352. At block 352, the test videos from block 330 are run to analyze the high-performing models. The analysis includes going through the testing videos frame-by-frame for those frames which include a detection to identify where in a frame a weapon or object of interest appears. In an embodiment, the DLS runs comprise one or more of the testing videos that were not used in the deep learning server. The output of a DLS job replicates the output of real-time inference with metadata including object size, object speed, event duration, and confidence score, among other parameters. The DLS output may be exported and, in an embodiment, the data exporter tool is used to format the metadata output into an Excel file or other file.

In an embodiment, feedback may be employed to further refine a model. For example, a video may be taken of a test situation for a trained model. That video may be used to retrain the model. In an embodiment, the video of the test situation may be added to the existing set of training videos for the trained model and the trained model may be retrained using the expanded set of training videos. In an embodiment, the retraining procedure may only use the video of the test situation. In an embodiment, the retraining procedure may only use the video of the test situation combined with a subset of the set of training videos, where the subset is 75% of the set, 50% of the set, between 25-75% of the set, less than 25% of the set, between 10% and 90% of the set, and all subranges therebetween.

At block 354, the metadata output may be analyzed in the metadata engine to identify false positive vs. true positives and filter the results. In an embodiment, results from an inference run are analyzed and fed back into the VPE for comparison to known standards. In an embodiment, false positives and true positives are counted based on the event parameters of each detection including, e.g., object size, object speed, event duration, movement distance, movement direction, color, background contrast, and confidence score. Other event parameters are contemplated by the present disclosure. In another embodiment, the filters that may be used are selected from the group of Event Duration, Confidence Score, Average Object Size, and Average Pixel Speed. In an embodiment, Event Duration is the time duration in which an "event" (e.g., an appearance of an item of interest, such as a weapon, until the item of interest no longer appears) occurs. In certain embodiments, the Event Duration is at least 1 sec., at least 2 sec., at least 5 sec., between 1-10 sec., and all subranges therebetween. In an embodiment, the Confidence Score is at least 97%. In certain embodiments, the Confidence Score is in the range from about 96% to about 98%, from about 95% to about 99%, from about 94% to about 99%, and all subranges therebetween. In an embodiment, the Confidence Score is an output value from the inference process, such that an image input to the deep learning engine is analyzed and the deep learning engine responds with how confident it is that the object it identified matches the criteria for detection. In an embodiment, the Average Object Size is determined from the number of pixels within a bounding box around the object (e.g., an item of interest, such as a weapon). In an embodiment, the Average Pixel Speed is a determination of how fast the item of interest moves from one position in one frame to another position in another frame.

The filtered results are used to analyze model performance by determining which metadata filters produce the highest number of true positives with the lowest number of false positives. The metadata output values are saved and used to determine the minimum and maximum parameters for triggering alerts. Additionally, the deep learning server is configured using the determined parameters and the top performing model is designated as the model to be run by the deep learning server.

In an embodiment, the process 300 may run on an intelligent video surveillance system (IVS System), which includes one or more microprocessors and/or a memory device. In an embodiment, the IVS System is able to analyze and/or detect differing environmental conditions/characteristics in real-time surveillance video. This may be accomplished, in an embodiment, by a dedicated environmental sensor that sends a signal to the microprocessor. Upon receipt of the signal, which is representative of an analyzed and/or detected environmental condition/characteristic, the microprocessor can dynamically select a situation-specific model (such as a neural network model) from an existing set of models to perform the inference and/or identification and/or detection function on the real-time surveillance video.

As a simplified, non-limiting example, the IVS System may include two separate models where the first model is trained using only video and images captured during daylight and the second model is trained using only video and images captured during the night under infrared lighting. Incoming video to be analyzed is pre-processed to determine whether the lighting parameters correspond to a day or a night setting. In an embodiment, the pre-processing may be based on a signal from an environmental sensor. In an embodiment, the pre-processing may be based on an analysis of just the incoming video (e.g., by comparing the average intensity value of a representative number of pixels in a frame of the incoming video to a threshold value saved in a memory device.) If the pre-processing determines that the incoming video is being taken during the day, then the IVS System automatically selects the first model. If the pre-processing determines that the incoming video is being taken during the night, then the IVS System automatically selects the second model.

In another embodiment, the microprocessor may receive a signal representative of the environmental conditions and/or an environmental characteristic in which the real-time surveillance video is currently operating. The signal may come from a weather station, a website feed, such as an RSS feed, or other similar input.

In a further embodiment, the IVS System may include a motion sensor to operate the real-time video surveillance camera.

In a further embodiment, the process 300 and/or the functionality of the IVS System discussed above may be embodied on a non-transitory, machine-readable medium having stored thereon a set of executable instructions to perform the process 300 and/or the functionality of the IVS System.

In an embodiment, any of the processes/methods in FIGS. 1-3 and/or 5, or discussed herein, may use the following exemplary, non-limiting method for testing and/or analyzing the performance of a model. As discussed above, metadata output from a testing run may be analyzed to identify false positives vs. true positives and filter the results. These filtered results may be used to analyze model performance by determining, in an embodiment, which metadata filters produce the highest number of true positives with the lowest number of false positives, or, in other embodiments, determining a ratio based on false positive and true positives.

FIGS. 4A and 4B represent exemplary, non-limiting, partial data from a model training/testing run showing a portion of the tracking of a model's progress. In this exemplary embodiment, a model is either kept or deleted based on a determined a ratio of false positives ("FP") to true positives ("TP") as discussed below.

FIG. 4A shows a table having columns A though H and rows 1 through 15.

FIG. 4B is an extension of FIG. 4A showing column A (which is the same as column A in FIG. 4A) and columns I through O. Rows 1-15 of FIG. 4B correspond to rows 1-15 of FIG. 4A. Row 1 represents the category of information in the associated column. Each of rows 2-15 represent a particular model as shown by the model number in column A.

Column B represents the number of images in the particular model. Column C represents the number of labels used, as discussed herein. Column D represents the number of iterations. Column E represents the momentum of the model, which is an indication of the speed of convergence of gradient descent optimization. Column F represents the ratio of the model which is an indication of the proportion of training to testing data. Column G represents the learning rate of the model which is an indication of the step size between iterations. Column H represents the weight decay of the model which is an indication of the regularization factor used to modulate the growth of weighted values. Column I represents a subcount of the total FP for a single label for the model run. Column J represents the number of total false positives for the model. Column K represents the number of total hits (i.e., TPs) for the model. Column L represents the ratio of total hits to false positives and is determined by dividing the value in column K by the value in column J. Column M represents the ratio (in percent) of false positives to total hits and is determined by dividing the value in column J by the value in column K. Column N represents the ratio of the ratios determined in columns M and L, i.e., (FP/hit)/(hit/FP), which is also in percent. Column O represents the status of the model, either "Deleted" or "Keep" depending on the value of the ratio in column N.

In an embodiment, a ratio is calculated comparing the relation of FPs to TPs to the inverse relation of TPs to FPs. If the final ratio (in column N) is, in an embodiment, at or below a predetermined threshold (in another embodiment the final ratio must be below a predetermined threshold), e.g., 1.00%, then the model testing can continue (i.e., "Keep").

As a non-limiting example, consider row 3 in FIGS. 4A and 4B. In row 3 (model r10-65k), the total FP=4 (col. J) while the total TP=52 (col. K). In col. L, the TP/FP ratio is 52/4=13. In col. M, the FP/TP ratio, which is multiplied by 100, is (4/52)*100=7.7%. The resulting ratio of (FP/TP)/(TP/FP) is 7.7/13=0.59%, as shown in col. N. Since this ratio is less than the exemplary predetermined threshold of 1.00%, further testing of the model may proceed. The predetermined threshold may be less than 0.9%, less than 0.8%, less than 0.7%, less than 0.6%, or less than 0.5%, or any other number that may be determined from testing of a particular model. In certain embodiments, the threshold for a particular model will decrease between two different runs from a first predetermined threshold to a second predetermined threshold.

In an embodiment, any of the above-discussed processes/methods in FIGS. 1-3 and/or may use the following exemplary method for determining labels (e.g., a "label tree") for a model run. As a non-limiting example, a dataset having a single label "gun" may be initially used. This dataset may be split into two subsets, e.g., "pistol" and "rifle." Other subsets are contemplated by the present disclosure where the object of interest may be further classified by the type of weapon, or by the type of object of interest. Each of these two subsets may further be split by, for example, specifying the position of the gun: As non-limiting examples for the "pistol" subset: "right pistol," "left pistol," "high right pistol," "high left pistol," "low right pistol," "low left pistol," etc. Similar specifications can be used for the "rifle" subset. The deep learning models can be tested using these specific label trees. As another example, each of the "pistol" and "rifle" subsets can be further split by assigning orientations in a clock-like fashion: "one o'clock pistol," "two o'clock pistol," "three o'clock pistol," etc. The same system can be applied to the rifle (or other) subset.

Figure 5:
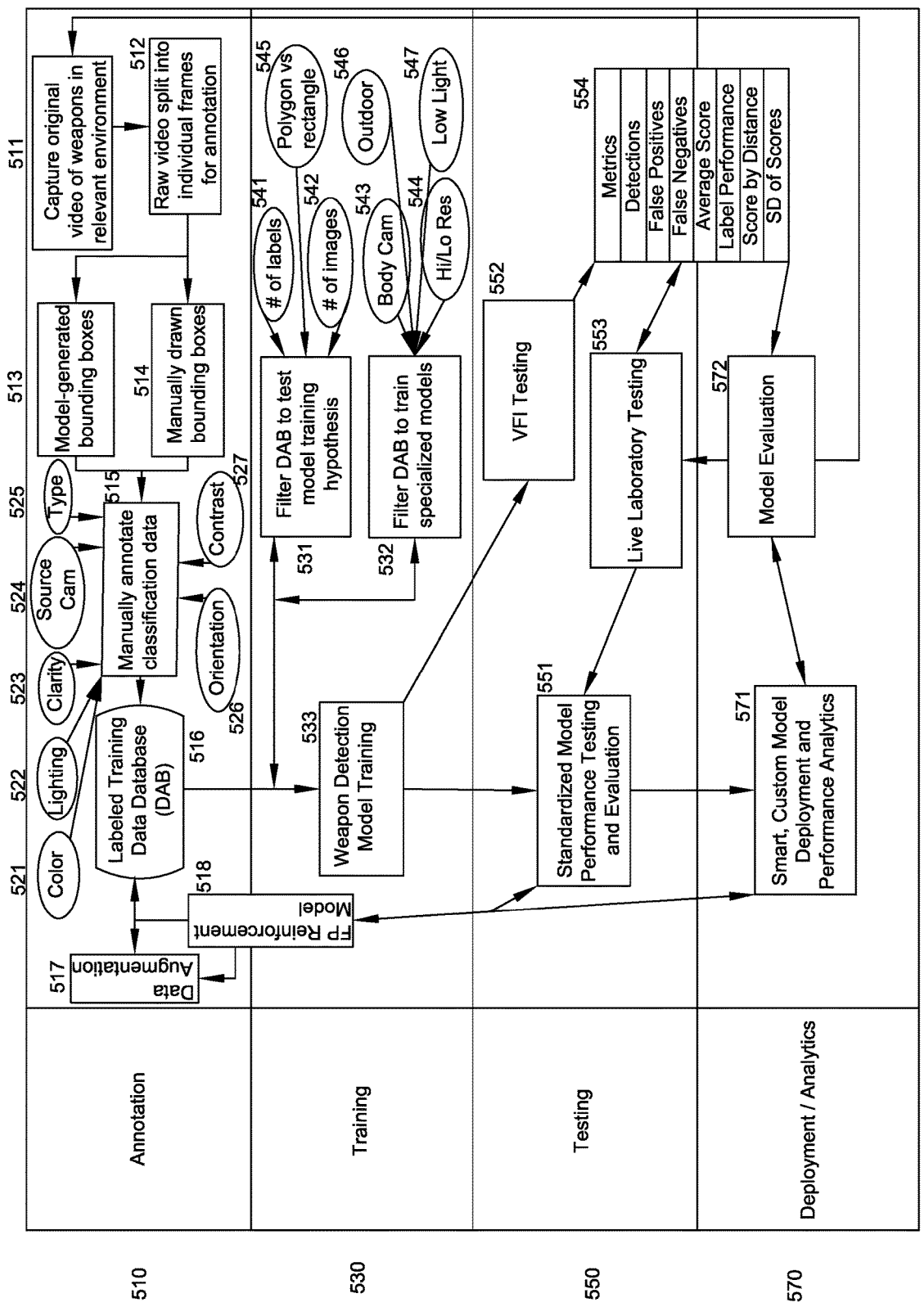
FIG. 5 is a flow chart of another process to train, detect, and/or identify an object of interest according to an embodiment of the present disclosure.

FIG. 5 is a flow chart in table format of another process to train, detect, and/or identify an object of interest using one or more models according to embodiments of the present disclosure described herein. Row 510 includes annotation processes. In an embodiment, the annotation phase includes capturing original videos, typically in relevant environments as discussed herein; annotating objects and attributes; applying automated bounding boxes/polygons to objects of interest; and then augmenting the data. Row 530 includes training processes. In an embodiment, the training phase includes filtering the database from the annotation phase where the filtering may be based on attributes, cameras, environments, etc., as discussed herein; and model training using bounding polygons and/or bounding boxes. Row 550 includes testing processes. In an embodiment, the testing phase uses video file inference testing, as described herein, and/or live testing to determine model performance. Row 570 includes deployment/analytics processes. In an embodiment, the deployment/analytics phase includes model evaluation and may incorporate a feedback loop between model performance and database composition.

Annotation Phase

In an embodiment, row 510 includes annotation processes. At block 511 original video is captured in a relevant environment for the particular setting/location for which the model will be employed. This may be accomplished by a person carrying an object of interest, such as a weapon, appearing and/or passing through a field of view of a still or video camera. In an embodiment, this may entail a person carrying a weapon in front of a camera at a client's site using video surveillance cameras already in place at the client site. At block 512, the original video, or portions thereof, are split into individual frames for annotation. At block 513, model-generated bounding boxes and/or bounding polygons are added to some or all of the frames from block 512. At block 514, manually-generated bounding boxes and/or bounding polygons are added to some or all of the frames from block 512. In an embodiment, both bounding boxes and bounding polygons may be added to some or all of the frames. At block 515, one or more of the frames are annotated/labeled with classification data, as discussed herein. In an embodiment, some or all of the annotations may be automatically generated by the model, manually added by an operator, or both. The models may be run using different combinations/permutations of classification data. In an embodiment, the classification data may include one or more of: at block 521, color (e.g., color of weapon, interloper's clothes, general environment, etc.); at block 522, lighting (e.g., day, night, overcast, ambient light, artificial light, combinations of lighting sources, etc.; in an embodiment lighting levels may be categorized as low, medium, or high); at block 523, clarity (e.g., focus, resolution, level of pixelization, blurriness, etc.); at block 524, source camera information (e.g., location, height above ground, distance from and or size of an interloper with object of interest (either or both of which may be determined based, at least in part, on one or more of the camera resolution, the camera field of view, and mounted height of the camera, or may be determined in relation to an object in the field of view with the interloper), GPS coordinates, manufacturer, model (which may be used to determine camera resolution), frame rate, color/black and white, f-stop, saturation level, etc.); at block 525, type of object of interest (e.g., pistol, rifle, or other type of weapon); at block 526, orientation of the object of interest (e.g., how held, rotational orientation (which, in an embodiment, may be determined using a protractor), extended from body, holstered, covered, etc.); and at block 527, contrast (e.g., color difference between object of interest and environment (e.g., clothing of interloper, background, other persons in the area, etc.); in an embodiment the RGB (or similar) levels of the object of interest may be compared with the RGB (or similar) levels of an area surrounding the object of interest, in an embodiment a bounding box/polygon may be expanded to include the object of interest as well as part of the immediate background in the image relative to the object of interest).

At block 516, the frames, some or all of which may include bounding boxes, bounding polygons, and/or annotations, are entered into a database ("DAB"). The database may be searchable by the associated metadata (e.g., bounding boxes, bounding polygons, annotations/labels, etc.) At block 517, data augmentation may be used to refine the metadata. As a non-limiting example, a bounding box and/or bounding polygon may be adjusted to better fit the object of interest. Examples of these adjustments include translating, rotating, expanding, contracting the one or more sides of the bounding box or bounding polygon. In an embodiment, a centroid of the bounding box/polygon (which may be one or more pixels) is determined. The centroid may be determined based on, e.g., the intersection points of two or more sides of the bounding box/polygon, the maximum and minimum x-coordinates of the bounding box/polygon, the maximum and minimum y-coordinates of the bounding box/polygon, or combinations thereof. The maximum and minimum coordinate values may be determined by the row and/or column number of pixels in the underlying frame/image using a predetermined location of the frame/image as the origin of the coordinate system. In an embodiment, other data that may be modified to further augment training data includes, but is not limited to, contrast, color levels, brightness, saturation, and hue.

At block 518, a false positive reinforcement model may supply data to adjust the data augmentation feature described above. As a non-limiting example, false positives are saved periodically, or from time-to-time, and may be incorporated, in whole or in part, into the iterative training process. In an embodiment, the false positive reinforcement model may also supply data to be entered into the database including typical model outputs including, but not limited to, confidence score, event duration, pixel area size, object speed, minimum range of object movement, average object size, and average pixel speed. In an embodiment, this data may be used to seed the annotation process with pre-existing data.

Training Phase

In an embodiment, row 530 includes training processes, as described herein throughout the present disclosure. At block 531, information from the database 516 may be used in whole or may be filtered for testing a model training hypothesis. Non-limiting examples of filtering include use of a particular type of label, group of labels, and/or number of labels (block 541); use of a particular image, group of images, and/or number of images (block 542); use of a bounding box and/or bounding polygon (either augmented or not) (block 545); and combinations thereof.

Additionally and/or alternatively, at block 532, information from the database 516 may be used in whole or may be filtered for training specialized models. Non-limiting examples of filtering include use of a bodycam or a camera in an elevator (block 543); use of a high or low resolution camera (block 544); use in an outdoor environment (block 546); use in low light conditions (block 547); and combinations thereof.

At block 533, weapon detection model training, as described herein, takes place using input from one of more of the database 516, the model training hypothesis at block 531, and/or the specialized model training at block 532.

Testing Phase

In an embodiment, row 550 includes testing processes, as described herein throughout the present disclosure. At block 551, the output of the weapon detection model training at block 533 is input into a standardized model performance testing and evaluation process. This process may also receive input from the FP reinforcement model 518. In an embodiment, a predetermined annotated testing video may be employed to test and judge a model's performance, including detections, false positives, true positives, and for measuring the accuracy of the location, orientation, size, etc. of bounding boxes/polygons. The standardized model performance testing and evaluation process at block 551 may use as input one or more of video file inference testing (block 552) or live testing (block 553). Live testing may include input from model evaluation (block 572). The testing may include the computation and/or compilation of a number of metrics (block 554), such as, e.g., one or more of those shown in FIGS. 4A and 4B, and/or detections (hits/true positives), false positives, false negatives, average score, label performance, score by distance, standard deviation of scores; and combinations thereof Deployment/Analytics Phase In an embodiment, row 570 includes deployment/analytics processes, as described herein throughout the present disclosure. At block 571, the output of the standardized model performance testing and evaluation (block 551) is input into the smart, custom model deployment and performance analytics process. Additionally, the process at block 571 may receive input from the FP performance model (block 518) and/or from the model evaluation process (block 572). Model evaluation (block 572 may receive input from metrics (block 554) and may provide feedback to the video capture at block 511.

Figure 6:
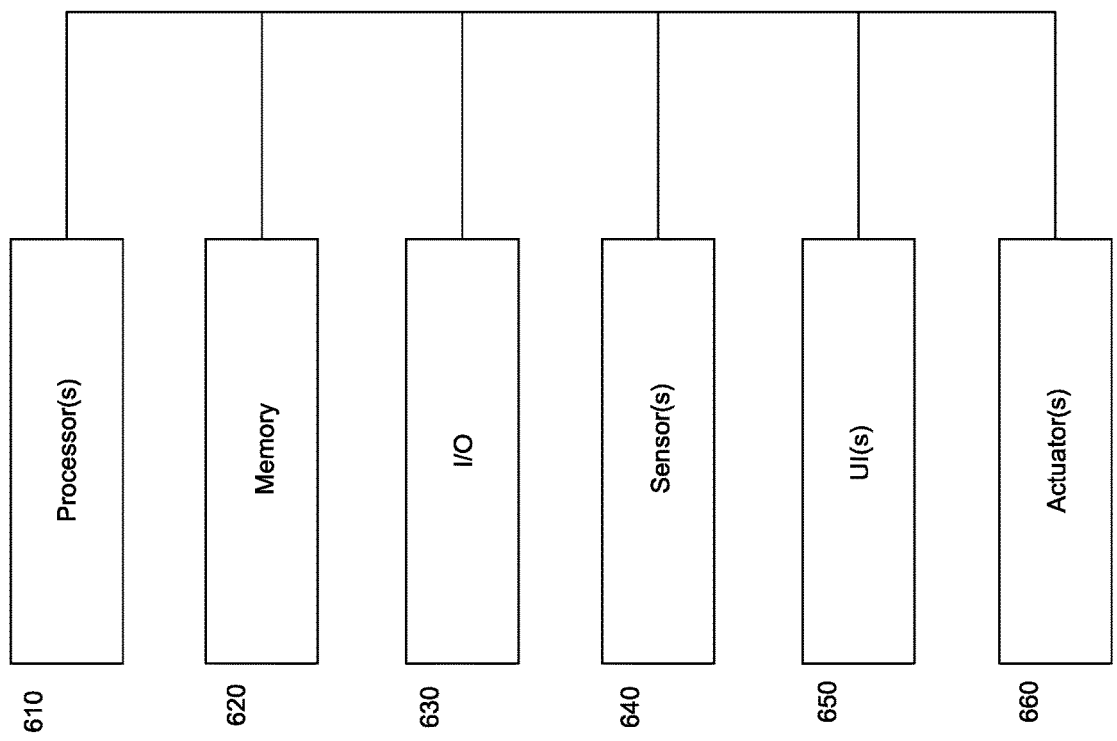
FIG. 6 is an exemplary processing system which can perform the process and/or method shown in any of FIGS. 1-5.

FIG. 6 is an exemplary processing system which can perform the process and/or method shown in any of FIGS. 1-5. Processing system 600 can perform the method of FIGS. 1-5 and/or the structure and/or functionality of the IVS System discussed above. Processing system 600 may include one or more processors 610, memory 620, one or more input/output devices 630, one or more sensors 640, one or more user interfaces 650, and one or more actuators 660. Processing system 600 can be distributed.

Processor(s) 610 may be microprocessors and may include one or more distinct processors, each having one or more cores. Each of the distinct processors may have the same or different structure. Processors 610 may include one or more central processing units (CPUs), one or more graphics processing units (GPUs), circuitry (e.g., application specific integrated circuits (ASICs)), digital signal processors (DSPs), and the like. Processors 21 may be mounted on a common substrate or to different substrates.

Processors 610 are configured to perform a certain function, method, or operation at least when one of the one or more of the distinct processors is capable of executing code, stored on memory 620 embodying the function, method, or operation. Processors 610 may be configured to perform any and all functions, methods, and operations disclosed herein.

For example, when the present disclosure states that processing system 600 performs/may perform task "X," such a statement conveys that processing system 400 may be configured to perform task "X." Similarly, when the present disclosure states that a device performs/may perform task "X," such a statement conveys that the processing system 600 of the respective may be configured to perform task "X." Processing system 600 is configured to perform a function, method, or operation at least when processors 610 are configured to do the same.

Memory 620 may include volatile memory, non-volatile memory, and any other medium capable of storing data. Each of the volatile memory, non-volatile memory, and any other type of memory may include multiple different memory devices, located at multiple distinct locations and each having a different structure. Examples of memory 620 include a non-transitory computer-readable media such as RAM, ROM, flash memory, EEPROM, any kind of optical storage disk such as a DVD, a Blu-Ray® disc, magnetic storage, holographic storage, an HDD, an SSD, any medium that may be used to store program code in the form of instructions or data structures, and the like. Any and all of the methods, functions, and operations described in the present application may be fully embodied in the form of tangible and/or non-transitory machine-readable code saved in memory 620.

Input-output devices 630 may include any component for trafficking data such as ports, antennas (i.e., transceivers), printed conductive paths, and the like. Input-output devices 630 may enable wired communication via USB®, DisplayPort®, HDMI®, Ethernet, and the like. Input-output devices 630 may enable electronic, optical, magnetic, and holographic, communication with suitable memory 630. Input-output devices 430 may enable wireless communication via WiFi®, Bluetooth®, cellular (e.g., LTE®, CDMA®, GSM®, WiMax®, NFC®), GPS, and the like. Input-output devices 630 may include wired and/or wireless communication pathways.

Sensors 640 may capture physical measurements of environment and report the same to processors 610. Examples of sensors 640 include photosensors. User interface 650 may include displays (e.g., LED touchscreens (e.g., OLED touchscreens)), physical buttons, speakers, microphones, keyboards, and the like. Actuators 660 may enable processors 610 to control mechanical forces. For example, actuators may be electronically controllable motors (e.g., motors for panning and/or zooming a video camera).

What is claimed is:

1. A method for training an object detection device, the method comprising:
   receiving a video stream;
   selecting a set of frames from the video stream;
   detecting a presence of an object in one or more frames of the set of frames;
   inserting bounding boxes in an area of the object in each of the one or more frames;
   annotating the bounding boxes with one or more attributes of the object;
   storing the one or more frames and the annotated bounding boxes in a database, the database configured to be searchable by at least one attribute of the one or more attributes;
   training a detection model using the database, wherein the training includes varying a first parameter of the detection model;
   analyzing a second set of frames from the video stream using the detection model to determine a number of true positive ("TP") events and a number of false positive ("FP") events, wherein the second set of frames that is different than the first set of frames;
   creating a dataset of the analysis of the second set of frames;
   filtering the dataset using a second parameter;
   determining a ratio of TP events to FP events ("TP/FP");
   determining a ratio of FP events to TP events ("FP/TP");
   converting the FP/TP to a percentage ("% FP/TP); and
   evaluating a performance of the detection model based at least in part on a ratio of % FP/TP to TP/FP.

2. The method of claim 1, wherein the video stream comprises footage from a security camera in a real-life environment.

3. The method of claim 1, wherein the video stream comprises footage from an artificially-created environment that simulates a real scenario.

4. The method of claim 1, wherein the object is directly visible in the one or more frames.

5. The method of claim 1, wherein the object is obscured from being directly visible in the one or more frames.

6. The method of claim 1, wherein the bounding boxes comprise a polygon that circumscribes at least a portion of the object.

7. The method of claim 1, wherein the one or more attributes of the object comprise one or more of a type and an orientation of the object.

8. The method of claim 7, wherein the one or more attributes of the object comprises a hierarchal order.

9. The method of claim 1, further comprising:
   annotating the bounding boxes with one or more attributes associated with the one or more frames comprising one or more of color, lighting level, clarity, security camera characteristics.

10. The method of claim 1, wherein the annotating is done manually by a user.

11. The method of claim 1, further comprising:
adjusting one or more of a location and a size of one or more of the bounding boxes.

12. The method of claim 1, wherein the first parameter comprises one or more of a number of labels, a number of images, a number of frames, a number of iterations, a max iteration value, a test iteration value, a test interval, a momentum value, a ratio value, a learning rate, a weight decay, and combinations thereof.

13. The method of claim 1, wherein the second parameter comprises one or more of confidence score, event duration, pixel area size, object speed, minimum range of object movement, average object size, and average pixel speed, and combinations thereof.

14. The method of claim 1, further comprising:
maximizing a difference between the number of TP events and the number of FP events, wherein the number of TP events is greater than the number of false positive events.

15. The method of claim 1, wherein the evaluation of the performance of the detection model comprises determining a performance metric comprising one or more of: the number of TP events, the number of FP events, a score value, an average score value, a label performance value, a score by distance value.

16. The method of claim 1, further comprising:
comparing the evaluated performance of the detection model with a performance of a second detection model.

17. The method of claim 1, further comprising:
one or more of changing, adding, and deleting an attribute of the one or more attributes based on the evaluated performance of the detection model.

18. A system for training an object detection device, the system comprising:
a processor operatively coupled to a memory configured to store computer-readable instructions that, when executed by the processor, cause the processor to:
receive a video stream;
select a set of frames from the video stream;
detect a presence of an object in one or more frames of the set of frames;
insert bounding boxes in an area of the object in each of the one or more frames;
annotate the bounding boxes with one or more attributes of the object;
store the one or more frames and the annotated bounding boxes in a database, the database configured to be searchable by at least one attribute of the one or more attributes;
train a detection model using the database, wherein the training includes varying a first parameter of the detection model;
analyze a second set of frames from the video stream using the detection model to determine a number of true positive ("TP") events and a number of false positive ("FP") events, wherein the second set of frames that is different than the first set of frames;
create a dataset of the analysis of the second set of frames;
filter the dataset using a second parameter;
determine a ratio of TP events to FP events ("TP/FP");
determine a ratio of FP events to TP events ("FP/TP");
convert the FP/TP to a percentage ("% FP/TP); and
evaluate a performance of the detection model based at least in part on a ratio of % FP/TP to TP/FP.

19. The system of claim 18, wherein the video stream comprises footage from a security camera in a real-life environment.

20. The system of claim 18, wherein the video stream comprises footage from an artificially-created environment that simulates a real scenario.

21. The system of claim 18, wherein the object is directly visible in the one or more frames.

22. The system of claim 18, wherein the object is obscured from being directly visible in the one or more frames.

23. The system of claim 18, wherein the bounding boxes comprise a polygon that circumscribes at least a portion of the object.

24. The system of claim 18, wherein the one or more attributes of the object comprise one or more of a type and an orientation of the object.

25. The system of claim 24, wherein the one or more attributes of the object comprises a hierarchal order.

26. The system of claim 18, wherein the computer-readable instructions, when executed, further cause the processor to:
annotate the bounding boxes with one or more attributes associated with the one or more frames comprising one or more of color, lighting level, clarity, security camera characteristics.

27. The system of claim 18, wherein the annotating is done manually by a user.

28. The system of claim 18, wherein the computer-readable instructions, when executed, further cause the processor to:
adjust one or more of a location and a size of one or more of the bounding boxes.

29. The system of claim 18, wherein the first parameter comprises one or more of a number of labels, a number of images, a number of frames, a number of iterations, a max iteration value, a test iteration value, a test interval, a momentum value, a ratio value, a learning rate, a weight decay, and combinations thereof.

30. The system of claim 18, wherein the second parameter comprises one or more of confidence score, event duration, pixel area size, object speed, minimum range of object movement, average object size, and average pixel speed, and combinations thereof.

31. The system of claim 18, wherein the computer-readable instructions, when executed, further cause the processor to:
maximize a difference between the number of TP events and the number of FP events, wherein the number of TP events is greater than the number of false positive events.

32. The system of claim 18, wherein the evaluation of the performance of the detection model comprises determining a performance metric comprising one or more of: the number of TP events, the number of FP events, a score value, an average score value, a label performance value, a score by distance value.

33. The system of claim 18, wherein the computer-readable instructions, when executed, further cause the processor to:
compare the evaluated performance of the detection model with a performance of a second detection model.

34. The system of claim 18, wherein the computer-readable instructions, when executed, further cause the processor to:

one or more of change, add, and delete an attribute of the one or more attributes based on the evaluated performance of the detection model.

\* \* \* \* \*